United States Patent [19]

Sherrill et al.

[11] 4,387,376
[45] Jun. 7, 1983

[54] PHASE LINEAR INTERFEROMETER SYSTEM AND METHOD

[75] Inventors: William M. Sherrill; Douglas N. Travers; Paul E. Martin, all of San Antonio, Tex.

[73] Assignee: The United States of America as represented by the Secretary of the Army, Washington, D.C.

[21] Appl. No.: 207,487

[22] Filed: Nov. 17, 1980

[51] Int. Cl.³ .............................................. G01S 5/02
[52] U.S. Cl. .............................. 343/113 R; 343/117 A
[58] Field of Search ........................ 343/117 A, 113 R

[56] References Cited

U.S. PATENT DOCUMENTS

| | | | |
|---|---|---|---|
| 3,540,053 | 11/1970 | Sparagna et al. | 343/113 R |
| 3,540,054 | 11/1970 | Broderick | 343/117 A X |
| 3,559,161 | 1/1971 | Raudsep | 343/113 R X |
| 4,057,803 | 11/1977 | Coleman | 343/117 A X |
| 4,170,774 | 10/1979 | Schaefer | 343/113 R X |

OTHER PUBLICATIONS

"Minitrack System Design Criteria" by J. T. Mengel (U.S. Naval Research Lab), Electrical Engineering, Aug. 1957, pp. 666–672.

*Primary Examiner*—Theodore M. Blum
*Attorney, Agent, or Firm*—Robert P. Gibson; Jeremiah G. Murray; Edward P. Griffin, Jr.

[57] ABSTRACT

A radio interferometer system and method for obtaining more accurate readings from a radio source by processing the received signal as a plane wave and establishing coincidence locations and conditions, and discarding readings which are noncoincidence within a selected tolerance.

6 Claims, 3 Drawing Figures

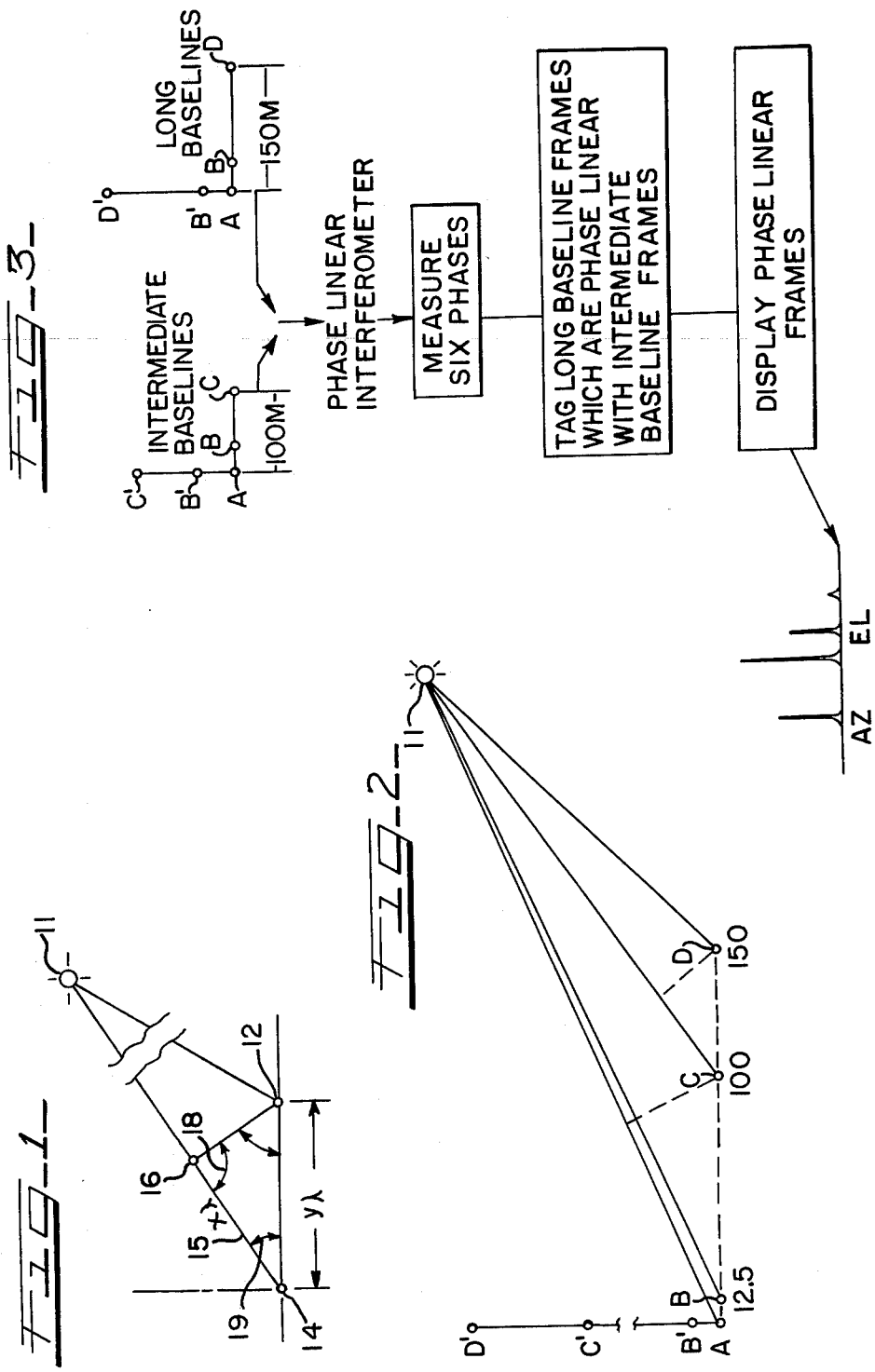

PHASE LINEAR INTERFEROMETER SYSTEM AND METHOD

The invention described herein may be manufactured and used by or for the United States Government for governmental purposes without the payment of any royalties therefor or thereon.

BACKGROUND OF THE INVENTION

Tracking artificial satellites by radio interferometers is known in the art. One of the earliest systems for this purpose was the Minitrack System developed by the Naval Research Laboratory discussed in the article "Tracking Satellites by Radio" by John T. Mengel and Paul Herget published in the January 1958 issue of *Scientific American*, Volume 198, Number 1, page 23.

Radio interferometers known in the art obtain the angular position of a radio source by measuring the difference in radio path lengths from a source to each of a group of antennas. For instance, FIG. 1 shows two antennas, 12 and 14, erected on a baseline which is precisely measured in length, location and direction. From the known measured length of this baseline, its radio path length is known to be n wavelengths. The signal from the radio source 11 arrives at antenna 12 at the same time as it arrives at point 16. Thus, the distance 15 is the difference in radio path length between radio paths to 12 and 14 equal to x wavelengths. When the source 11 is at great distance, the angle 18 is a right angle, and the cosine of angle 19 is $x\lambda/n\lambda$ or $x/n$. If a measurement of the relative phase of the signals arriving at 12 and 14 is made, the value of x, and hence angle 19 would be determined. However, if the path length difference exceeds one wavelength, ambiguous readings will result. Such ambiguities are resolved by using multiple pairs of antennas for each baseline direction, arranged so that the shortest baseline does not produce a radio path length difference exceeding one wavelength anywhere within the beam pattern of the antennas used. The outputs of each of these antenna pairs are then processed to fine tune the calculation.

The addition of another baseline, normal to the first, provides a second angle to the radio source. All of the angle measurements are made as direction cosines. Accordingly, two such measurements allow the third direction cosine to be calculated, to determine the angular position of the radio source.

In practice however, the radio or sky waves provided by a radio source such as an artificial satellite are characterized by multiple propagation paths from radio source to the receiving or sending location. For the case of a transmitting source on the earth's surface, stratification in the ionosphere causes the typical sky wave to arrive at one or more elevation angles by single, double or multiple hop modes which may include one or more ground reflections. The ionosphere also causes polarization rotation and doppler variation as a function of time. These time-varying phenomena are sometimes very pronounced and very rapid and can cause erroneous readings at the receiving location.

Obviously, it is desirable and necessary to obtain radio wave phase data which is more accurate to calculate the exact position of the radio source. Accordingly, it is a primary object of the present invention to provide a system and method for obtaining the aforesaid more accurate data.

SUMMARY OF INVENTION

The present invention discloses a system and method for providing phase linear processing of measured radio wave phase data from a radio source such as a satellite, to discard phase data which is not within a selected tolerance range, and to further process only that phase data which is phase linear within a certain range to thereby obtain a more accurate reading and hence more accurate radio source position information.

The foregoing features and advantages of the present invention will be apparent from the following more particular description of the invention. The accompanying drawings listed hereinbelow are useful in explaining the invention wherein:

DESCRIPTION OF DRAWINGS

FIG. 1 is a line sketch useful in explaining a basic prior art radio interferometer operation;

FIG. 2 is a line sketch useful in explaining the present invention; and

FIG. 3 is a block diagram describing the operation of the present invention.

DESCRIPTION OF INVENTION

The line sketch of FIG. 2 discloses a basic concept of the present invention. As described above, theoretically a single plane wave front can be processed quite adequately by the structure of the prior art. However, in actual operation the radio or sky waves will have irregular wave fronts and/or phase gradients due to multiple and varied propagation paths. The occurrence of a wave interference field with sufficiently irregular phase fronts and/or phase gradients will produce serious error. Such a case may correspond to the reception of several rays, from different directions, none of which are dominant in amplitude for more than a brief period. The interferometer tends to respond to the resultant field.

It has been found that the probability of phase ambiguity resolution error on the long baselines is quite high.

The present invention provides a system for making a phase linear test of phase data at separate locations, as will be explained. It has been found that phase linear processing of measured phase data will remove the more serious ambiguity errors which are related to wave interference as it occurs in radio or sky wave transmissions.

In addition to improvement in direction finding performance, simplification of operator displays is effected by minimizing ambiguity errors. A very significant improvement in direction finding accuracy and precision may be obtained by the inventive technique.

The phase linear test tends to recognize plane waves when they momentarily occur. While multiple plane wave fields may pass the phase linearity test, it has been found that a moderate phase linearity test is sufficient to discard the majority of data frames which produce phase resolution errors. The improvement over earlier interferometer data using five antennas has been consistently very significant, especially in azimuth for both high and low elevation angles.

The present system interprets the signal as a plane wave, but also recognizes certain conditions which correspond to a grossly disturbed wave front or wave gradient. When these conditions are observed, the measurements are discarded to obtain improved bearings.

Note that the phase linear test does not always recognize true plane waves so much as it recognizes and rejects gross phase nonlinearities which produce phase resolution ambiguity errors which derive from severe wave interference conditions.

Refer to FIG. 2 and consider the seven-element A, B, C, D, B', C' and D' antenna system. The antennas are located at precisely measured distances, say 12.5 meters, 100 meters, and 150 meters from the apex or center antenna.

An essentially constant amplitude and phase gradient, over the array is characteristic of a single plane wave and a high signal-to-noise ratio. The phase linear test is applied by scaling the baseline phase values to the same aperture, and requiring equality within some tolerance. More specifically, the phase linear test compares the intermediate baseline phase times the aperture ratio to the long baseline phase.

Referring only to the baseline defined by antenna stations A, B, C and D, the phase delay readings at antenna staions A, B, C, and D are obtained, as discussed hereinabove with relation to FIG. 1 and the prior art. In one embodiment readings are taken at 20 millisecond intervals. The trigonometric relations of the radio source to the various antenna stations is known. Accordingly, readings that should be obtained at long baseline station D are calculated using the readings at intermediate baseline station C, as a reference. The actual readings obtained at long baseline station D are then compared with the calculated readings and if the actual readings are within a selected tolerance of the calculated readings, the actual readings are accepted for further processing. That is, within a selected range, the actual readings must be phase linear with the calculated readings.

Note that the operation for antennas A, B', C' and D' defining an orthogonal baseline of FIG. 2 are also conducted concurrently with the baseline of antennas A, B, C and D.

FIG. 3 shows in explanatory block form, the preferred technique utilized in the invented phase linear interferometer. As indicated, six phase angle measurements are scanned to provide a single phase linear frame. Next, the long baseline frames which are phase linear with the intermediate baseline frames are tagged. Then the long baseline frames are displayed. Next, upon command, the frames which are phase linear are displayed to the operator.

Thus, the criterion for discarding dubious data is obtained by scaling the phase from the intermediate baseline antenna (station C) and "predicting" the phase to be expected at the long baseline antenna (station D). If the measured phase at long baseline antenna D does not agree within a selected tolerance, for example 20°, that data set is discarded or not accepted.

The foregoing technique is effective to reject erroneous data, and accept for further processing, data which has a higher probability of being accurate. In actual practice, the results provide a significant improvement in accuracy.

While the invention has been particularly shown and described with reference to a preferred embodiment thereof, it will be understood by those skilled in the art, that various changes in form and details may be made therein without departing from the spirit and scope of the invention.

We claim:

1. A phase linear interferometer system comprising: at least four antennas for receiving signals from a source, said antennas being linearly positioned at preselected points to form a baseline array such that:
   the first and second antennas form a short baseline;
   the first and third antennas form an intermediate baseline; and
   the first and fourth antennas form a long baseline; said short and said intermediate baselines forming a first interferometer and said short and said long baselines forming a second interferometer;
   processor means connected to each of said antennas for measuring and processing the phase of said received signals, said processor means including means for combining said phase signals within each of said interferometers and providing an output phase from each of said interferometers of all of said signals which are phase linear;
   comparison means connected to said processor means for comparing the scaled phase of said first interferometer with the measured phase of said second interferometer to determine the relative coincidence of the output phases; and
   output means connected to said comparison means for discarding output phase signals exceeding a given tolerance range of coincidence.

2. A phase linear interferometer system according to claim 1 wherein said short baseline produces a radio path length difference not greater than one wavelength of the operating frequency.

3. A phase linear interferometer system according to claim 2 further comprising:
   at least three additional antennas;
   said three additional antennas being linearly positioned at preselected points and combining to form a second baseline array of at least four antennas with said first antenna means;
   said second baseline array being angularly offset from said first baseline;
   said second baseline array being connected to means substantially similar to those of said first baseline array for producing substantially similar results from a second output means; and
   means connected to the output means of each of said baselines for correlating said output phase signals to provide the angle of arrival of said source signals.

4. A phase linear interferometer system according to claim 3 wherein said first and second baselines are angularly positioned to form a right angle.

5. In a phase linear interferometer system including at least four antennas positioned along a baseline array such that:
   the first and second antennas form a short baseline,
   the first and third antenna means form an intermediate baseline, and
   the first and fourth antenna means form a long baseline,
the method of processing signals comprising the steps of:
   receiving signals at each antenna on the baseline array and determining the signal phase at each of said antennas;
   determining the relative phase along the short baseline;
   determining the relative phase along the intermediate baseline and discarding the phase data which is not phase linear with that of the short baseline;

determining the relative phase along the long baseline and discarding phase data which is not phase linear with that of the short baseline;

scaling the measured phase from the intermediate baseline by the aperture ratio of the long baseline to the intermediate baseline to provide a calculated phase for the long baseline;

comparing the calculated phase to the measured phase for the long baseline and discarding the data if beyond a given tolerance.

6. The method recited in claim 5 further comprising:

repeating the procedure of claim 5 for a second baseline array positioned at an angle with respect to the first baseline array;

using the angles from the two baselines to determine the angle of approach of the signal.

* * * * *